(12) United States Patent
Ludtke

(10) Patent No.: US 6,986,463 B2
(45) Date of Patent: Jan. 17, 2006

(54) METHOD AND SYSTEM OF BROADCASTING ITEM LOCATION

(75) Inventor: Harold A. Ludtke, San Jose, CA (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/014,958

(22) Filed: Dec. 11, 2001

(65) Prior Publication Data

US 2002/0138372 A1 Sep. 26, 2002

Related U.S. Application Data

(60) Provisional application No. 60/254,606, filed on Dec. 11, 2000.

(51) Int. Cl.
G06F 17/60 (2006.01)

(52) U.S. Cl. .................................. 235/385; 235/383
(58) Field of Classification Search ................ 235/385, 235/378, 381, 383, 462.01, 462.45, 472.01
See application file for complete search history.

(56) References Cited

U.S. PATENT DOCUMENTS

| | | | |
|---|---|---|---|
| 4,558,300 A | 12/1985 | Goldman | |
| 4,929,819 A | 5/1990 | Collins, Jr. | |
| 4,973,952 A | 11/1990 | Malec et al. | |
| 5,047,614 A | 9/1991 | Bianco | |
| 5,111,196 A | 5/1992 | Hunt | |
| 5,294,781 A | * 3/1994 | Takahashi et al. | 235/376 |
| 5,329,589 A | 7/1994 | Fraser et al. | |
| 5,543,789 A | 8/1996 | Behr et al. | |
| 5,572,653 A | * 11/1996 | Detemple et al. | 395/501 |
| 5,682,525 A | 10/1997 | Bouve et al. | |
| 5,938,721 A | 8/1999 | Dussell et al. | |
| 5,944,769 A | 8/1999 | Musk et al. | |
| 5,987,380 A | 11/1999 | Backman et al. | |
| 6,000,610 A | 12/1999 | Talbott et al. | |
| 6,123,259 A | * 9/2000 | Ogasawara | 235/380 |

* cited by examiner

Primary Examiner—Daniel Stcyr
(74) Attorney, Agent, or Firm—Lerner, David, Littenberg Krumholz & Mentlik, LLP

(57) ABSTRACT

A system and method for locating items includes broadcasting the descriptions of multiple product and their locations to remote devices. Preferably, the remote device compares the broadcasted products with pre-stored products, and displays any matches.

26 Claims, 2 Drawing Sheets

METHOD AND SYSTEM OF BROADCASTING ITEM LOCATION

CROSS-REFERENCE TO RELATED APPLICATIONS

The present application claims the benefit of U.S. Provisional Patent Application No. 60/254,606 filed Dec. 11, 2000. The disclosure of such application is hereby incorporated by reference.

BACKGROUND OF THE INVENTION

Generally when people shop, they write down a list of the items they wish to buy on a piece of paper (or electronically if they are using a personal digital assistant (PDA) with document editing features) and take it to the store. As the customer shops, they cross off the items on the list as they are retrieved.

However, no matter how complete the list is, the customer cannot know for sure where every single product is located in the store and whether a particular store carries a product. While customers may achieve great familiarity with the location and range of products carried by a store they frequently visit, this knowledge and skill usually has little applicability to other stores.

Although stores may provide maps showing the location of goods, the maps often contain more information than the customer needs, thus making it difficult to locate the items the customer wants. Computers are also occasionally provided, but they are typically stationary and require the user to key in the products they want. Thus, in-store computers are often too inconvenient and time consuming for many customers to use.

What is needed is a portable and easy-to-use system and method for matching a shopping list to the goods actually carried by a retail store so the customer knows what is and is not available. It would be further beneficial to present this information in a manner that enables the customer to locate the products. It would be particularly advantageous if the customer is told not only what products are available and where they are located, but also what order the products should be retrieved for maximum efficiency.

SUMMARY OF THE INVENTION

The present invention is directed towards these needs.

In one aspect of the invention, a method of broadcasting information regarding the location of a plurality of items at a site includes broadcasting a site signal representing a plurality of item records for receipt by a remote device, each item record comprising an item identifier and item location. The item description describes the item and the item location describes the location of said item relative to the site. The site may be a building.

Another aspect of the invention relates to a remote device for storing information about the location of products at a site. The remote device includes a processor under the control of programs, a modem for demodulating wireless signals containing information about items, the information including a description and location of the item, a display and instructions. The instructions are executable by the processor and determine if items identified by the information within the wireless signal matches information relating to items stored in the remote device. The instructions also cause matching items on the display to be displayed.

A further aspect of the invention relates to a method of locating products. The method includes obtaining a first broadcasted signal, the first broadcasted signal identifying a plurality of items and information relating to the location of the items within a site. At least one item identified in the first broadcasted signal is matched to item information stored on a portable device. A second broadcasted signal is also obtained, the second broadcasted signal relating to the matched item and being broadcasted at a point proximate to the location of the matched item. An indication is provided on the portable device when the second broadcasted signal has been obtained.

Yet another aspect of the invention involves a system for locating products in a store. It includes a store transmitter broadcasting the identities of a plurality of products located within the store and information relating to the location of such products within the store. A plurality of product transmitters further broadcast the identity of a product or class or products (the location of the product transmitter being associated with the location of the product or class of products). The system also provides for a portable device including a broadcast receiver, instructions and a processor capable of executing the instructions. The instructions include receiving the identities and locations of the products or classes broadcast by the store transmitter; selecting one of the products or classes; receiving the broadcast of the product transmitter associated with the selected product or class; and based on the strength of the product transmitter signal, providing an indication on the remote device that the device is at a location proximate to the selected product or class.

Yet a further aspect of the invention relates to a system of identifying the location of products. The system includes a number of local transmitters at locations within a site. The system also includes a number of product transmitters, each product transmitter located near a product and transmitting information relating to the product and its location within a site. A product transmitter determines its location based on a signal from a local transmitter. A central receiver receives the product and location information from the product transmitters, and a transmitter transmits information relating to the plurality of products and their locations received by the central receiver.

DETAILED DESCRIPTION OF THE PREFERRED EMBODIMENTS

Figure 1:
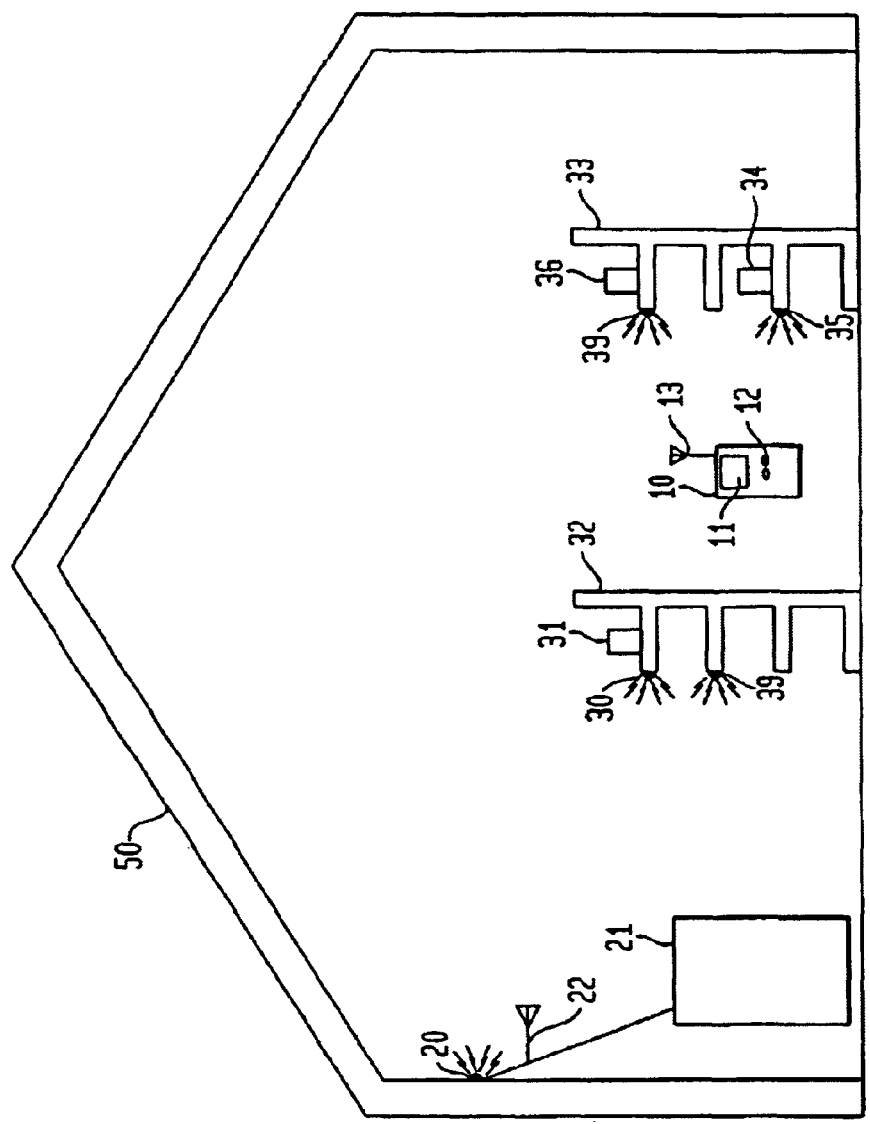
FIG. 1 is a schematic view of a system in accordance with one aspect of the invention.

A system in accordance with one embodiment of the present invention is shown in FIG. 1.

The system generally provides a product location system for a store 50 comprising a personal data assistant (PDA) 10, store broadcast unit 21 and product transmitters 30, 35.

Figure 2:
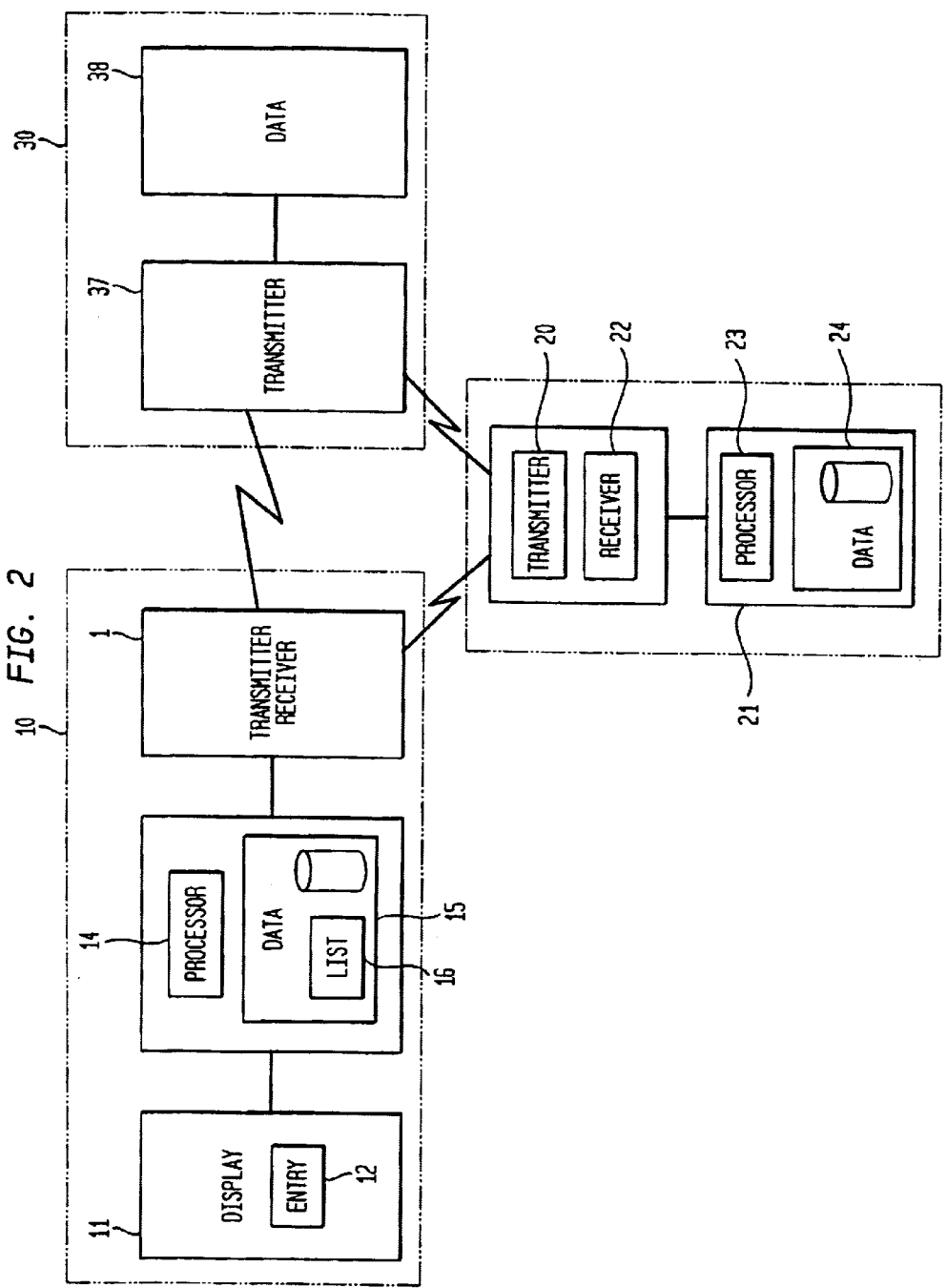
FIG. 2 is a functional diagram of a system in accordance with one aspect of the invention.

As shown in FIG. 2, store broadcast unit 21 includes a wireless communication transmitter 20, wireless receiver 22 such as an antenna, processor 23 and data 24. Processor 23 and data 24 may be contained in the same store unit 21. Preferably, store unit 21 comprises a general purpose computer configured for wireless communication. Although the method of wireless communication may comprise any method well known in the art including relatively complex modes of communication, the method may also comprise relatively-simple paging technology which sends and receives text messages.

PDA 10 may comprise any number of personal data assistants with wireless communication capability such as a Palm Pilot. As shown in FIG. 2, PDA 10 comprises at least a transmitter/receiver 13, processor 14, data 15, display 11 and data entry mechanism 12 such as buttons or a touch-screen. The PDA is portable and is intended for personal use by an end-user rather than permanent installation in store 50. The data contains software instructions executed by processor 14 which, among other things, checks transmitter/receiver 13 for signals received from store transmitter 20. The software executed by processor 14 is configured to check for signals either continuously, periodically or upon some event, such as a user pressing a button 12. Data 15 further includes a list 16 of products which the operator of the PDA (hereinafter the "end user") wishes to purchase. The list is stored as a string of characters such as "milk, eggs, cheese."

The system further includes a plurality of product transmitters 30, 35. Product transmitters 30, 35 are preferably near-field wireless transmitters and, preferably, each transmitter is associated with a particular product 31, 34. Optionally, each transmitter may be associated with a particular class of products. Each transmitter may also be a wireless LAN-type transmitter (e.g., Bluetooth, IEEE 802.11b or the like). The product transmitters are placed near the bar-coded price stickers typically affixed to the face of the product shelves. Each transmitter broadcasts a unique signal in, desirably, the same bandwidth. For example, product transmitter 30 may periodically transmit the number "30" and product transmitter 35 may periodically transmit the number "35". Thus, each product transmitter broadcasts a unique identifier of that transmitter. Data block 38 of product transmitter 30 (functionally illustrated in FIG. 2) contains the unique identifier.

Data block 24 of store unit 21 contains information about the location of the various products and product transmitters distributed throughout store 50. For example, data block 24 contains a database table of records having the following fields for the following purposes:

ProductName—a description of the particular product by brand, generic description and size. For example, product 31 of FIG. 1 may be identified as "X-Brand Bread, 16 oz."

ProductClass—a generic description of the class of the product. Using the same example, product 31 of FIG. 1 may be identified in this field as simply "Bread."

ProductTransmitterID—the unique identifier of the product transmitter associated with the product. Using the same example, the record of product 31 may identify product transmitter 30.

Aisle—the set of shelves containing the product such as "7R" for the right side of aisle 7.

Shelf—the height of the shelf containing the product. For product 31, this value may be "1T" to identify the top shelf and for product 34 it may be "2B" to identify the second shelf from the bottom.

Distance—the distance between the product's location and the beginning of the aisle. The value need not be exact but, rather, can correspond with a particular range. Using the same example, the field may contain the value "M" which corresponds with product 31 being in the middle of the aisle (contrasted with "B" and "E" which relate, respectively, to the beginning and end of the aisle).

This collection of information shall hereafter be referred to as the "Product Location Database." The location of a product and its associated product transmitter may be readily obtained by querying the database.

In operation, processor 23 initializes by querying the database 24 to determine the number of different product classes contained within the store. The processor then queries the database to create a record set, with the criteria that a single record is created for each product class having the same values in the aisle and distance fields. For ease of reference, this record set shall be referred to as the "Broadcast Information." For example, if all of the bread in the store is contained halfway-down aisle 7 on the right-hand side, the record set will contain a single record corresponding with bread having the following fields (and values): ProductClass ("Bread"), Aisle ("7R") and Distance ("M"). If bread is also contained in a different aisle or part of the aisle, a separate record is created for that information as well.

After initialization, processor 23 continuously broadcasts the Broadcast Information across the store 50 via transmitter 20. Although it is desirable for the signal to be of sufficient strength to reach the far edges of the store, it is actually only necessary for the transmitter to reach the entrance of the store. By limiting the transmission to text and the Broadcast Information to classes of goods, the processor can broadcast the entire record set in a relatively short amount of time.

When an end-user enters store 50 with PDA 10, PDA 10 scans for signals from transmitter 20 as explained above. When the PDA senses the signal, processor 14 downloads the Broadcast Information into data area 15. Once the information is downloaded, the PDA alerts the user that information about the location of products in the store is available and contained in the PDA by displaying a message to that effect on display 11. The PDA may now ignore the subsequent broadcasts of the Broadcast Information and, accordingly, the PDA will be freed for other tasks.

One of those tasks is to compare the Broadcast Information with the shopping list 16 already stored in PDA 10 and create a list of matches. Specifically, PDA 10 queries the Broadcast Information and determines whether one of the items in the shopping list 16 matches the value of a ProductClass field in one of the records of the Broadcast Information. If so, that particular record is added to a new record set hereinafter referred to as Product Match Record Set. Once the Product Match Record Set is created, the product classes are shown in list format to the user on the PDA via display 11.

Preferably, the Product Match Record Set is sorted before it is displayed. For example, the Product Match Record Set is ordered to provide the user with the most efficient route through the store for obtaining items. More particularly, the processor 14 orders the record set in the following priority order:

1. Ascending Aisle number ignoring the "left-side" or "ride-side" suffix;
2. Ascending or descending Distance, where ascending or descending is chosen so that the distance value of the previous record equals the distance value of the next record; and
3. Suffix of Aisle number, i.e. left or right-hand side.

In other words, the record set is first put in aisle order. Next, and without causing the aisle order to change, the records are shifted so that, where possible, the distance values are the same from one record to the next. This sorting step has two purposes. First, if a user is buying many products in the same aisle, the products are grouped by distance down the aisle so the user is not instructed to go back and forth down the same aisle. Second, when a user leaves one aisle and goes to the next, the user will be in the general area they need to be. In other words, if the last product retrieved by the user was at the "end" of aisle 7 and the user needs to get two products from aisle 8 where one of the products is it at the "beginning" of aisle 8 and the other is at the "end", then it is more efficient to instruct the user to get the item at the "end" of aisle 8 immediately after leaving aisle 7 rather than sending the user to the "beginning" of the aisle and then back down to the "end". Finally, the left and right sides are grouped together. For example, the following unsorted Product Match Record Set:

| ProductClass | Aisle | Distance |
|---|---|---|
| Bread | 7R | E |
| Pasta | 5R | M |
| Tomato Sauce | 5L | B |
| Canned Tomatoes | 5R | B |
| Canned Corn | 5R | B |
| Canned Beans | 5L | E |
| Milk | 8L | B |
| Cheese | 8L | E | would be ordered as follows:

| ProductClass | Aisle | Distance |
|---|---|---|
| Tomato Sauce | 5L | B |
| Canned Tomatoes | 5R | B |
| Canned Corn | 5R | B |
| Pasta | 5R | M |
| Canned Beans | 5L | E |
| Bread | 7R | E |
| Cheese | 8L | E |
| Milk | 8L | B |

This minimizes the amount of unnecessary traveling by the user. The foregoing Product Match Record Set should be displayed in a user-friendly format such as:

Tomato Sauce, Aisle 5, Left-hand side, at beginning.

Canned Tomatoes, Aisle 5, Right-hand side, at beginning.

Canned Corn, Aisle 5, Right-hand side, at beginning.

Pasta, Aisle 5, Right-hand side, in middle.

Optionally, the Product Match Record Set is presented to the user in natural language format to assist the user's understanding of where to go and what to do. For example, rather than showing the foregoing list, the display would state:

Step 1: Go to beginning of aisle 5, on left-hand side, and get Tomato Sauce.

Step 2: On right-hand side, get Tomato Sauce.

Step 3: In same area, get Canned Corn.

Step 4: Further down the same aisle, get Pasta.

The navigational instructions are created by checking for relationships between adjacent records. For example, if the aisle and distance fields have identical values from one record to the next, the keywords "In same area, get" are shown before the product description of the second record. If the only difference between two adjacent records is the side of the aisle, the keywords "On right-hand side, get" or "On left-hand side, get" are used. Similar keywords may be selected for other permutations and differences in field values.

It is not necessary to limit the Broadcast Information to product classes. Rather, and particularly if store 50 contains a limited number of products, the ProductName and ProductTransmitterID fields are also transmitted. Such a record set shall be referred to herein as an Expanded Broadcast Information. PDA 10 would thus compare shopping list 16 not on the basis of the ProductClass field, but rather the ProductName field wherever a specific product is identified in the shopping list.

The advantage of transmitting Expanded Broadcast Information is that the user can get information not only on the general location of broad classes of products, but also the exact location of specific products. This is particularly helpful if a general class of products is stored in two or more aisles.

Moreover, if the user's shopping list 16 identifies the exact product and not just the product class, and if the store uses product transmitters 30, 35, then the Expanded Broadcast Information provides the user with even more navigational information. In operation, after PDA 10 displays the Product Match Record Set, processor 14 scans antenna 13 for wireless transmissions from the product transmitters 30, 35. If a wireless transmission from a product transmitter is received, the processor compares the unique identifier of the incoming signal with the ProductTransmitterID field of the record associated with the first item on the Product Match Record Set. The processor continues this scan until a match is found and, when a match is found, will flash the display 11 or otherwise alert the user. Because product transmitters 30, 35 use near-field transmitters, this match will not occur unless PDA 10 is close to the product transmitter. Thus, upon receiving the alert, the user will know that PDA 10 is very close to the item at issue. Upon finding the item, the user may push button 12 to remove that item from the displayed list and repeat the scanning process for the next record in the Product Match Record Set.

Preferably, the Product Location Database is created automatically rather than manually. In the manual method, the Product Location Database is created by keying in the location of the various products.

In the automatic method, the Product Location Database is created by having central store transmitter/receiver 20 scan all item transmitters 30, 35, querying each one for its product type and location in the store. Preferably, when items are stocked in the shelves, and when they are re-arranged on the store shelves, product transmitters 30, 35 are moved with the items. This is similar to current paper tags; when items are stocked on store shelves, the paper tags describing the product and its price must be co-located with the item. The automatic method also includes fitting the store shelves with local transmitters 39, such that each transmitter is permanently located and configured to provide its shelf location when queried. When store transmitter 20 requests an update of product type and location from product transmitters 30, 35, each product transmitter 30, 35 will subsequently query the permanent shelf location transmitters to find its location. Using commonly available techniques of measuring signal strength and other characteristics, it is possible for product transmitters 30, 35 to determine their position on a shelf, even if they are placed directly between their two nearest permanent shelf location transmitters. For example: assume a product transmitter 30 is located in the very middle of a shelf, with permanent shelf location transmitters A and B on its left, C and D on its right (the product transmitter is directly between B and C). If product transmitter 30 queries all permanent shelf transceivers that are within range of its signal (which can be minimized to just a few feet by lowering the power used to broadcast the signal), and if product transmitter 30 measures the signal strength of the responses from transmitters A, B, C and D, it can determine that the signal strength from B and C are equal and greater than the signal strength of A and D, and therefore its position on the shelf is between B and C. Further, the responses from the permanent shelf location transmitters indicate that their locations are at the beginning, middle or end of a shelf; from the combination of responses and the inference of its relative position to them, the product transmitter 30 can then provide the necessary product location information to store transmitter 20. This process may be repeated for all product transmitters 30, 35 in the store, and the product location database is then built automatically. In the embodiment of automatic database creation, it will be preferable for product transmitters 30, 35 to be wireless-LAN-type transmitters such as Bluetooth or IEEE 802.11b which provide several meters of range, as opposed to near-field transmitters that are typically limited to only a few centimeters of transmission range.

Rather than the shopping list 16 of PDA 10 containing a simple textual list of desired products, the list 16 may also include one or more e-coupons such as those disclosed in patent application Ser. No. 09/476,462 incorporated herein by reference. As disclosed therein, the coupons often contain a description of the product class associated with the coupon. The processor 14, accordingly, can check the coupons for product class of the coupon in essentially the same manner that it checks the textual list.

When Expanded Broadcast Information is combined with e-coupons, the advantages of the present invention in terms of convenience increases exponentially. One advantage is that when a user has an e-coupon stored in the PDA, the PDA can alert the user whenever he or she enters a store carrying the product covered by the coupon. Not only is the user alerted as to the presence of an item associated with the coupon, but the user is also told exactly where the product is located and how to get there.

On the other hand, it is not necessary to store the shopping list 16 in PDA 10 before the user enters the store. Rather, provided the PDA contains a user-operable means for selecting products (such as writing the description or class of the product with a pen and touch-screen), the user may ask the PDA 10 at any point where a particular product or class of products are located.

The records of the Broadcast Information may also contain common synonyms or subsets for the product classes. For example, in the case of synonyms, the ProductClass field of a record in the Broadcast Information may contain not only the word "hot dog" but also the word "frankfurter." In the case of subsets, the ProductClass field may contain not only the word "cheese" but also "cheddar, mozzarella" and any number of other cheese types. By broadcasting synonyms and subsets, and checking each word of shopping list 16 against each word in the ProductClass field, the invention is able to increase the likelihood finding a proper match.

Unless stated to the contrary, use of words such as "including," "containing," "such as," "comprising" and the like, means "including without limitation" and shall not be construed to limit any general statement that it follows to the specific or similar items or matters immediately following it. References to a "plurality" of things means at least two of the things, and, unless stated to the contrary, reference to "a" or "one" thing does exclude the possibility of using a plurality of such things. Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:

1. A method comprising:

broadcasting a site signal within a site representing a plurality of item records associated with a plurality of items within the site, each said item record comprising item identifier information and item location information, said item identifier information describing said items and said item location information describing the location of said items within the site;

receiving the site signal at a remote device within the site;

using the remote device to compare at least some of the item identifier information in the site signal with user selected item information stored on the remote device; and displaying to a user the item identifier and item location information that match the user selected item information based on the comparison, wherein the site signal includes a first broadcasted signal, the first broadcasted signal including the item identifier information and at least some of the item location information, and a second broadcasted signal, the second broadcasted signal relating to one or more of the matched items and being broadcast at a point proximate to the location of the matched item within the site.

2. The method of claim 1 wherein the site is a building, the items comprise products within the building, and the site signal is broadcasted from a location within the building.

3. The method of claim 1 wherein the step of broadcasting occurs after the user selected item information is stored in the remote device.

4. The method of claim 1 further including the step of ordering the displayed item identifier and location information based on the item location information transmitted with the site signal.

5. The method of claim 4 wherein the remote device is a personal data assistant.

6. The method of claim 1 wherein the step of broadcasting a site signal is repeated.

7. The method of claim 6 wherein the step of broadcasting comprises broadcasting the signal repetitively regardless of whether said remote device is present at said site.

8. The method of claim 1 wherein the first signal broadcast range is greater than the second signal broadcast range.

9. The method of claim 8 wherein the second signal is generated by a near-field wireless transmitter.

10. The method of claim 8 wherein the second signal is generated by a wireless LAN transmitter.

11. The method of claim 1 wherein the second signal identifies a class to which the matched item belongs.

12. The method of claim 1 wherein the second signal identifies the matched item.

13. The method of claim 1 further including displaying a notification to the user that the matched item is associated with a coupon stored in the portable device.

14. A system, comprising:

a store transmitter broadcasting information associated with a plurality of products located within the store, the information including product identifier information describing the products and product location information relating to a location of such products within the store, a plurality of product transmitters each broadcasting identity information of a product or class of products, a location of the product transmitter being associated with the location of the product or class of products, and a portable device including a broadcast receiver, a memory containing a list of products desired by a user, and a processor capable of executing actions in response to program instructions, the actions including: receiving the information broadcast by the store transmitter; selecting at least one of the products or classes by comparing the information broadcast by the store transmitter with the list of products stored in the memory; receiving the identity information broadcast by the product transmitter associated with selected product or class; and based on the strength of the product transmitter signal, providing an indication on the remote device that the device is at a location proximate to selected product or class.

15. The system of claim 14 wherein each product transmitter transmits a signal indicative of its associated product or class.

16. The system of claim 15 wherein the product transmitters transmit at the same bandwidth and the signal indicates the product or class by transmitting an identifier unique to the product or class.

17. The system of claim 14 wherein the store transmitter is located within the store and transmits a signal sufficient to reach the interior of the store.

18. The system of claim 14 wherein the store transmitter is located near the entrance of the store.

19. The system of claim 14, wherein:

the system further comprises a plurality of local transmitters disposed at locations within the store;

each product transmitter is located near the product and transmits information relating to the product and a location of the product within the store, and each product transmitter determines the location of the product based on a signal from one or more of the a local transmitters;

the system further comprises a central receiver receiving the product and location information from the product transmitters; and the system further comprises a central transmitter transmitting information relating to the plurality of products and their locations received by the central receiver.

20. The system of claim 19 wherein each product transmitter determines the location of the product based on a signal from a plurality of local transmitters.

21. The system of claim 19 wherein each product transmitter determines the location of the product based on the signal strength of a plurality of local transmitters.

22. The system of claim 19 wherein the signal of each local transmitter includes information identifying the local transmitter.

23. The system of claim 19 wherein the signal of each local transmitter includes information identifying the location of the local transmitter.

24. The system of claim 19 wherein the product transmitters comprise wireless-LAN transmitters.

25. The system of claim 19 wherein the local transmitter broadcasts the position of the local transmitter on a shelf of products.

26. The system of claim 19 wherein the portable device is operable to receive the information from the central transmitter and to display at least one of the products associated with the information.

* * * * *

UNITED STATES PATENT AND TRADEMARK OFFICE
CERTIFICATE OF CORRECTION

PATENT NO. : 6,986,463 B2 Page 1 of 1
APPLICATION NO. : 10/014958
DATED : January 17, 2006
INVENTOR(S) : Harold A. Ludtke It is certified that error appears in the above-identified patent and that said Letters Patent is hereby corrected as shown below:

Column 7,
Line 42, "products are located" should read -- products is located --.

Column 10,
Line 3, "the a local" should read -- the local --.

Signed and Sealed this

Twentieth Day of June, 2006

JON W. DUDAS
*Director of the United States Patent and Trademark Office*